United States Patent [19]

Bates et al.

[11] Patent Number: 4,921,554

[45] Date of Patent: May 1, 1990

[54] JOINING OF POROUS SILICON CARBIDE BODIES

[75] Inventors: Carl H. Bates; John T. Couhig, both of Worcester, Mass.; Paul J. Pelletier, Thompson, Conn.

[73] Assignee: Norton Company, Worcester, Mass.

[21] Appl. No.: 250,018

[22] Filed: Sep. 27, 1988

[51] Int. Cl.$^5$ .............................................. B32B 18/00
[52] U.S. Cl. ...................... 156/89; 264/60; 264/65; 419/5; 419/14; 419/42; 419/51; 419/68
[58] Field of Search ................. 156/89; 264/43, 60, 264/65; 75/228, 236; 419/5, 14, 42, 49, 51, 68

[56] References Cited

U.S. PATENT DOCUMENTS

| | | | |
|---|---|---|---|
| 4,070,197 | 1/1978 | Coes | 106/44 |
| 4,419,161 | 12/1983 | Hailey | 156/89 |
| 4,526,649 | 7/1985 | Gupta et al. | 156/629 |
| 4,541,975 | 9/1985 | Honma et al. | 264/65 |
| 4,707,312 | 11/1987 | Bajaj | 264/43 |

FOREIGN PATENT DOCUMENTS 2022490 12/1979 United Kingdom.
2015910 3/1982 United Kingdom.
2137975 10/1984 United Kingdom.

OTHER PUBLICATIONS

Letters: Joining of Dense Silicon Carbide by Hot-Pressing, T. Iseki et al., Journal of Materials Science 15 (1980), pp. 1049–1050.

*Primary Examiner*—Caleb Weston
*Attorney, Agent, or Firm*—Arthur A. Loiselle, Jr.

[57] ABSTRACT

A method of joining two porous bodies of silicon carbide is disclosed. It entails utilizing an aqueous slip of a similar silicon carbide as was used to form the porous bodies, including the sintering aids, and a binder to initially join the porous bodies together. Then the composite structure is subjected to cold isostatic pressing to form a joint having good handling strength. Then the composite structure is subjected to pressureless sintering to form the final strong bond. Optionally, after the sintering the structure is subjected to hot isostatic pressing to further improve the joint and densify the structure. The result is a composite structure in which the joint is almost indistinguishable from the silicon carbide pieces which it joins.

20 Claims, 1 Drawing Sheet

4,921,554

JOINING OF POROUS SILICON CARBIDE BODIES

This invention resulted from the performance of United States ORNL/DOE Subcontract No. 86-XSB-045C.

TECHNICAL FIELD

This invention relates to a method of joining porous silicon carbide bodies to each other to form more complex shapes, and more particularly to the joining thereof so as to produce a joint which is indistinguishable from the bodies after the composite structure has been sintered.

BACKGROUND AND INFORMATION DISCLOSURE STATEMENT

The following publications are representative of the most relevant prior art known to Applicants at the time of the filing of this application.

| U.S. Pat. Nos. | | |
| --- | --- | --- |
| 4,070,197 | January 24, 1978 | Coes |
| 4,419,161 | December 6, 1983 | Hailey |
| 4,526,649 | July 2, 1985 | Gupta et al. |

| Other Publications | | |
| --- | --- | --- |
| GB 2,015,910 | September 19, 1979 | Carborundum Co. |
| GB 2,022,490 | December 19, 1979 | Olson |
| GB 2,137,975A | October 17, 1984 | Kennedy et al. |
| Iseki et al., J.Mat.Sci 15:1049 (1980) | | |

Silicon carbide molded bodies having complex shapes are in practice made of several parts which have been joined together. However, in view of the relatively inert nature of silicon carbide, there has been considerable difficulty in effecting the joining operation, particularly when the end use of the joined silicon carbide pieces will be at temperatures of greater than 1500 degrees C. This is particularly true for beta-silicon carbide. Accordingly the art is replete with various methods for joining silicon carbide pieces. However, none of the prior art joining methods has been found sufficient to bond porous silicon carbide bodies to each other to produce a composite structure in which, after sintering, the joint is able to withstand temperatures of at least 1500° C. without failure under a tensile load.

The joining of alpha-silicon carbide parts has been performed in the past generally either by (i) the use of adhesives or glues such as metal alloys, molten silicon, platinum pastes, borodiphenylsiloxane polymers in combination with silicon carbide powders, and the like or (ii) attempting in situ recrystallization of silicon carbide from silicon and carbon. Other methods which have been used include Coes (U.S. Pat. 4,070,197) teaches the use of a silicon carbide containing slip having the same bimodal alpha-silicon carbide composition as the parts being joined, but then after sintering must impregnate the composite structure with 10 to 30% silicon to actually form a bond which has strength Thus the use of a silicon carbide slip by itself was insufficient to form a strong bond. Moreover, the casting slip composition used failed to include any sintering aids, i.e. boron or carbon.

Hailey (U.S. Pat. 4,419,161) discloses joining either sintered or unsintered silicon carbide pieces by using metal borides, such as molybdenum boride ($Mo_2B_5$), in a temporary binder which will leave little carbon char. When Hailey tried to use a cement of unsintered silicon carbide containing a carbon source and a sintering aid, he found that the "joints are not mechanically sound and are subject to breakage when exposed to mechanical shock" (Col. 5, 1. 2–6)

Another method of joining silicon carbide pieces is Gupta (U.S. Pat. 4,526,649) which teaches first roughening the silicon carbide surfaces to a depth of about 100–500 um by removal of excess silicon or by pitting and then filling the space with a cokable resin and adding liquid silicon to react with the resin at elevated temperatures in the absence of an applied force.

GB 2,015,910 teaches the use of a powdered cement comprised of molybdenum disilicide and a binder and heating to above 2030 C. in an inert atmosphere.

GB 2,022,490 joins pre-densified silicon carbide parts by first siliconizing them and inserting between them a cement of silicon carbide of the same particle size as the parts being joined in combination with carbon. Upon heating, formation of additional silicon carbide serves to join the parts.

GB 2,137,975A suggests putting a carbon source between the parts to be joined and then adding molten silicon to the joint to recrystallize silicon carbide to form a bond.

Iseki et al. joins dense sintered silicon carbide parts by placing a sinterable sub-micron silicon carbide powder containing boron and carbon as well as aluminum and iron between the parts and then subjecting the composite to hot pressing at a temperature of at least 1650 C. The parts so joined exhibit a substantial decrease in strength at temperatures above 1500 C.

Accordingly, there is a need for a method of joining porous silicon carbide bodies such that, after sintering, the joint is indistinguishable from the parts that have been joined and also does not become a failure point when the composite structure is subjected to a tensile load, particularly at temperatures of above 1500 C. For future silicon carbide applications, there is a need for a joining method which will produce a joint which, under scanning electron microscopic examination, is essentially indistinguishable from the pieces being joined. Thus it is an object of the present invention to produce a silicon carbide joint meeting these criteria.

SUMMARY OF THE INVENTION

The present invention provides a method of joining two porous silicon carbide bodies to each other which comprises (i) forming an aqueous slip having a similar silicon carbide composition to that used to form the bodies to be joined in combination with a binder which during sintering will burn out and leave essentially no carbon residue, (ii) placing the two bodies to be joined in close proximity to each other to form an interstice therebetween and filling the interstice with the slip to form a composite structure, (iii) subjecting the composite structure to cold isostatic pressing to form a joint which has good handling strength, and (iv) sintering the pressed structure to densify it to at least 90% of theoretical density. Thereafter the joint may be subjected to hot isostatic pressing to improve it and to further densify the composite part produced.

DESCRIPTION OF THE PREFERRED EMBODIMENTS

Figure 1:
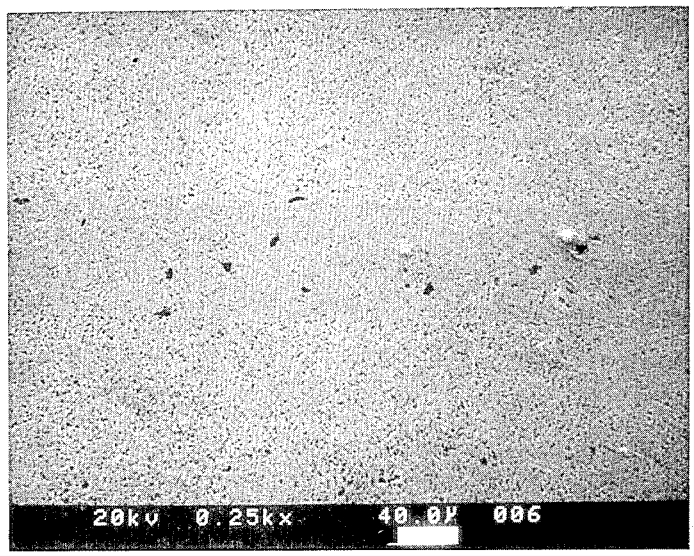
FIG. 1 is a SEM micrograph of a joint produced by the present invention, i.e. placing a silicon carbide slip between the parts, cold isostatically pressing the structure, and then pressurelessly sintering it.

The present invention enables the joining of two porous silicon bodies. By the term "porous" is meant a porosity of at least about 35 percent, preferably at least about 38 percent, and indicates that the body has not undergone any substantial sintering until after the joining operation. In the joining of such porous bodies, there are actually two bonds which must form. The first being a secondary bond between the porous bodies which is effective at room temperatures to give the unsintered composite structure sufficient strength to be handled and transported, i.e. from one operation to another. And the second is the primary bond which will hold the pieces together during their eventual use which will quite often be at very high temperatures. It is this dual bonding requirement which makes the joining of porous bodies more difficult than the joining of densified and sintered bodies.

The bodies of porous silicon carbide to be joined by the present invention will generally have a density on the order of about 50 to 65% of theoretical, i.e. they contain about 35 to 50% porosity. They comprise silicon carbide in either of its crystal structures, i.e. alpha, beta, or a mixture of the two, together with up to about 5% by weight sintering aids such as boron, carbon, aluminum, and mixtures thereof. In addition, conventional processing aids such as lubricants, surfactants, plasticizers and the like may also be present. Generally the bodies will be prepared by simply pressing the silicon carbide composition into the desired shape, though alternatively casting, injection molding, or extrusion may be used to form them. Under some circumstances it may prove beneficial to prefire the bodies to increase their green strength. This may be performed by heating them to below the sintering temperature of the silicon carbide, i.e. about 1800 C., in an argon atmosphere. Under other circumstances it may be desirable to subject the bodies to a cold isostatic pressing before they are joined. This may be advantageous depending upon the shapes being joined. Further details on cold isostatic pressing are provided below.

The silicon carbide slip which will provide the initial secondary bond between the porous bodies is an aqueous mixture of silicon carbide particles which have a similar crystallography and size distribution to those used to form the green bodies. The slip further contains an organic binder to assist in the formation of the initial bond. The binder is preferably one which is clean burning, i.e. during the subsequent sintering operation it will burn out leaving no substantial (preferably less than about 4%) residues of inorganic ash or the like. Examples of appropriate binders include such as waxes, thermosetting resins, gums, polyvinyl alcohols, methyl cellulose, thermoplastic resins and mixtures thereof. A particularly suitable binder which has been found to produce a superior initial bond is Dow Chemical's Experimental Binder XUS 40303.00 which chemically is a poly(ethyl oxyazaline). In addition, the slip contains sintering aids as are in the porous bodies. The sintering aids are generally present in an amount from about 50 to 200 percent of their content in the porous bodies being joined. Surfactants to improve the flowability of the slip may also be present in small amounts. The slip will generally contain about 20 to about 60 weight percent, preferably about 40 to about 60 percent, and most preferably about 52 to about 56 percent solids.

A small amount of the slip is placed on at least one of the joining surfaces, the two porous bodies are properly aligned, and they are then pressed and held together. Generally only a slight hand pressure is required though more may be used. The water from the slip is allowed to absorb into the blocks drying the thin, i.e. about 100 microns, joint layer. After only a few minutes, the joined porous body structure is sufficiently stable to be cold isostatically pressed (CIPped).

The structure is then placed into the cold isostatic press where it is subjected to three-dimensional isostatic pressing by a liquid. Preferably the pressing is performed by water or a non-flammable organic liquid. A function of the CIPping is to force the remaining moisture out of the joint layer and into the porous bodies to thereby make the joint appear identical to the porous bodies and to produce an effective seal of the joint. The CIPping is performed, as is well known in the art, by enclosing the structure in a rubber bag which is sealed. Oftentimes it is then placed inside a second rubber bag which is also sealed to better keep out the liquid which will press on the structure. To be certain that no liquid is able to reach the structure it may even be desirable to triple bag it. The structure is then CIPped at a pressure of at least about 25,000 psi, preferably at least about 40,000 psi, and most preferably at least about 50,000 psi. This produces a joint with good initial strength and consolidates both the joint and the silicon carbide bodies being joined.

The structure is then subjected to elevated temperatures to remove the moisture slowly. Generally this is performed by heating at a temperature of about 50 to 90 C. for from about 5 to about 24 hours. Preferably the slow drying is performed at about 75 C. overnight.

The dried structure is then conventionally sintered to form the final strong bond between the joined bodies. Generally the sintering is performed until at least about 95% of the theoretical density is obtained. This is done by heating to a temperature of at least about 2050 C. for at least about 30 minutes in an inert atmosphere. Preferably the sintering is continued for at least 45 minutes. Most preferably it is conducted in an induction furnace in an argon atmosphere of about 15" of mercury to about 2100 C. for about one hour. The resulting joint is essentially indistinguishable from the silicon bodies which FIG. 1 is a scanning electron micrograph of a joint prepared as described above.

If it is desired to further consolidate the joint and/or further densify the entire structure, the structure may be subjected to hot isostatic pressing (HIPping). Suitable conditions for the HIPping include temperatures of greater than about 1700 C., pressures greater than about 22,000 psi, and a time of at least 30 minutes at temperature. Preferable conditions are at least about 1850 C. and at least about 25,000 psi for at least about 45 minutes. Most preferably, the conditions are at least about 1950 C. and at least about 30,000 psi for about one hour.

Figure 2:
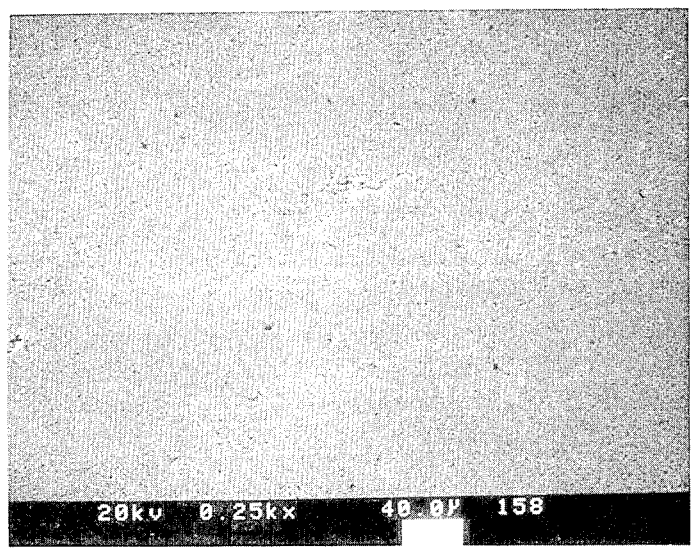
FIG. 2 is a SEM micrograph of a joint prepared as FIG. 1 which was then hot isostatically pressed.

To prevent any potential damage to the joint from the HIPping, it is preferably conducted in such a manner that no gas or other species is allowed to possibly enter the joint. This may be accomplished by any of several methods. For instance, the HIPping may be conducted by enclosing the composite structure in a tantalum can (as disclosed in such as U.S. Pat. No. 3,932,178) and evacuating the can prior to increasing the temperature and pressure. Alternatively, the structure may by enclosed within a glass or a material forming glass upon heating (the "ASEA" process disclosed in such as U.S. Pat. Nos. 4,081,272, 4,112,143, 4,256,688, 4,446,100, and 4,455,275, the disclosures of which are incorporated herein by reference). FIG. 2 is a scanning electron micrograph of a joined structure which has been prepared as above and then "ASEA" HIPped. As can be seen the joint is essentially indistinguishable from the bodies which have been joined.

The silicon carbide parts joined according to the present invention can be machined to their final shape without this raising any particular problems.

The following specific examples are provided by way of information and not limitation. They demonstrate the preparation and testing of the joints of this invention. All parts and percents are by weight unless otherwise specified.

EXAMPLE I

Beta-silicon carbide powder doped with 2% carbon and 1% boron as sintering aids is pressed into 1"×1"×2"bricks in a hardened steel die at a pressure of 4,000 psi. A reactive slip is prepared as follows: 10 grams of <325 mesh predoped submicron betasilicon carbide powder (Superior Graphite BSC 059) is added with stirring to 9 grams of a 10-1 solution of Dow Experimental Binder XUS 40303.00 in deionized water; 0.03 grams of a surfactant (Aerosol OT from Fisher Scientific) is added to give a flowable but viscous dispersion.

A few drops of the slip is then placed between two pressed blocks which are to be joined. The blocks are properly aligned and then pressed together. The water from the slip is allowed to be partially absorbed into the blocks but the slip is not allowed to dry completely as it must remain plastic to be able to form the final joint.

The completed joint is then placed inside a rubber bag and the bag tied tightly. This bag is inserted into a second bag which is also tied shut. The multi-bagged structure is then cold isostatically pressed to a pressure of 55,000 psi in conventional CIPping equipment from Autoclave Engineers. A joint with excellent green strength is obtained. The structure is placed overnight in an oven at 75 C. to slowly remove all of the moisture present.

Co-sintering of the blocks and the joint is then performed by heating the structure in an induction furnace in an argon atmosphere of 15" of mercury to 2,100 C. for 1 hour. This achieves densification to about 95% of the theoretical density and produces a strong composite structure.

To evaluate the strength of the joint at room temperature, test bars of 2 mm×3 mm ×30 mm are produced and tested in four point bending with the joint plane perpendicular to the tensile face of the bar. The results of the tests which were replicated on seven samples are as follows:

|  | Flexural Strength |
| --- | --- |
| Mean | 26,800 psi |
| Min. | 18,300 psi |
| Max. | 35,100 psi |
| S.Dev. | 6,100 psi |

These results demonstrate that a strong uniform joint is produced by the method of this invention. It should be noted that only one of the bars broke at the joint, thus demonstrating that the joints formed are at least as strong, if not stronger, than the silicon carbide blocks which have been joined.

EXAMPLE II

The procedure of Example I was repeated except that after the co-sintering operation the joined structure was subjected to glass encapsulated hot isostatic pressing (HIPping) according to the ASEA technology at 1900 C. for one hour under 207 MPa (30,000 psi) pressure of Ar. Eight replicates were made. The results of the flexure testing at both room temperature and at 1530 C. were as follows:

|  | Flexure Strength, psi | |
| --- | --- | --- |
|  | Room Temperature | 1530 C. |
| Mean | 42,000 | 37,000 |
| Min. | 35,500 | 31,000 |
| Max. | 50,600 | 70,000 |
| S.Dev. | 5,000 | 13,300 |

These results demonstrate that even stronger, more uniform joints are produced by adding a hot isostatic pressing step to the method. It should be noted that three of the test specimens broke at the joint during the room temperature test, but that only one of the test specimens did so at 1530 C.

COMPARATIVE EXAMPLE A

The procedure of Example I is repeated except that no cold isostatic pressing step is used. The joint falls apart after the sintering operation, i.e. no substantial bond is formed in the absence of the cold isostatic pressing step of this invention.

EXAMPLE III

The procedure of Example II is repeated except that the beta-silicon carbide is replaced with the alpha form in both the bodies being joined and in the slip which joins them. Again, a strong non-porous joint is produced.

EXAMPLE IV

The procedure of Example II is repeated except that the binder is replaced with each of the following:
 a. methyl cellulose
 b. polyethylene glycol
 c. dextrin
 d. polycarbosilane
 e. polyvinyl alcohol In each case a strong uniform bond is produced which is essentially indistinguishable from the bodies being joined as shown by scanning electron microscopic examination.

EXAMPLE V

The procedure of Example I is repeated except that the pressure at which the structure is CIPped is reduced to only 40,000 psi. The resultant joint is slightly weaker than that of Example I but still exhibits sufficient strength for most high temperature applications.

EXAMPLE VI

The procedure of Example II is repeated except that the bodies being joined are pre-fired at 1800 C. for one hour in argon to completely dry them prior to starting to form the joint. This additional step has been found to minimize a minor cracking problem which had been observed with some samples during the cold isostatic pressing operation.

COMPARATIVE EXAMPLE B

The procedure of Example II is repeated except that a binder is used which does not completely burn off during the sintering operation. The binder is sodium silicate. Pressureless sintering of the composite structure results in no densification, i.e. the joint remains porous and the bodies are not joined. The composite structure is then HIPped in a glass encapsulant but still no joined structure is produced.

What is claimed is:

1. A method of joining two porous sinterable silicon carbide bodies to each other which comprises (i) forming an aqueous slip having a silicon carbide composition which is essentially the same as that used to form the bodies to be joined in combination with at least one sintering aid and a binder which during sintering will burn out and leave essentially no residues, (ii) placing the two bodies to be joined in close proximity to each other to form an interstice there between and filling the interstice with said slip to form a composite structure, (iii) subjecting the composite structure to cold isostatic pressing to form a joint having good handling strength, and (iv) sintering the pressed structure to densify it to at least 90% of theoretical density.

2. The method of claim 1 wherein the porous silicon carbide bodies contain at least about 35% porosity.

3. The method of claim wherein the porous silicon carbide bodies contain about 35 to about 50 percent porosity.

4. The method of claim 1 wherein alpha-silicon carbide is used to form both the bodies and the slip.

5. The method of claim 1 wherein beta-silicon carbide is used to form both the bodies and the slip.

6. The method of claim 1 wherein the binder is selected from the group consisting of waxes, thermosetting resins, gums, polyvinyl alcohols, methyl cellulose, thermoplastic resins and mixtures thereof.

7. The method of claim 6 wherein the binder is a poly(ethyl oxyazaline).

8. The method of claim 1 wherein the sintering aid in the slip is present in an amount of about 50 to about 200% of its content in the porous bodies.

9. The method of claim 8 wherein the sintering aid is a combination of boron and carbon.

10. The method of claim 1 wherein the slip further comprises a surfactant.

11. The method of claim 1 wherein the slip has a solids content of about 40 to about 60 weight percent.

12. The method of claim 1 wherein the slip has a solids content of about 52 to about 56 weight percent.

13. The method of claim 1 wherein the cold isostatic pressing is conducted at a pressure of at least about 25,000 psi.

14. The method of claim 1 wherein the cold isostatic pressing is conducted at a pressure of at least about 40,000 psi.

15. The method of claim 1 wherein the cold isostatic pressing is conducted at a pressure of at least about 50,000 psi.

16. The method of claim 1 wherein the sintering is performed at a temperature of at least about 2050 C. for at least about 30 minutes.

17. The method of claim wherein after sintering the joined structure is subjected to hot isostatic pressing.

18. The method of claim 17 wherein the hot isostatic pressing is conducted at a temperature of at least about 1700 C. and a pressure of at least about 22,000 psi for at least about 30 minutes.

19. The method of claim 17 wherein the hot isostatic pressing is conducted in a manner which precludes any gas or other species from entering the joint.

20. The method of claim 19 wherein the manner for precluding is sealing the structure in a material selected from a tantalum can, glass, or a material which will form a glass upon heating.

* * * * *

UNITED STATES PATENT AND TRADEMARK OFFICE
CERTIFICATE OF CORRECTION

PATENT NO. : 4,921,554

DATED : May 1, 1990

INVENTOR(S) : Carl H. Bates, et al

It is certified that error appears in the above-identified patent and that said Letters Patent is hereby corrected as shown below:

Column 7, line 41 after "claim" insert --1--.

Column 8, line 32 after "claim" insert --1--.

Signed and Sealed this

Seventh Day of July, 1992

Attest:

DOUGLAS B. COMER

*Attesting Officer*       Acting Commissioner of Patents and Trademarks